J. W. LEDOUX.
FLUID METER.
APPLICATION FILED JUNE 22, 1911.
1,026,324.
Patented May 14, 1912.
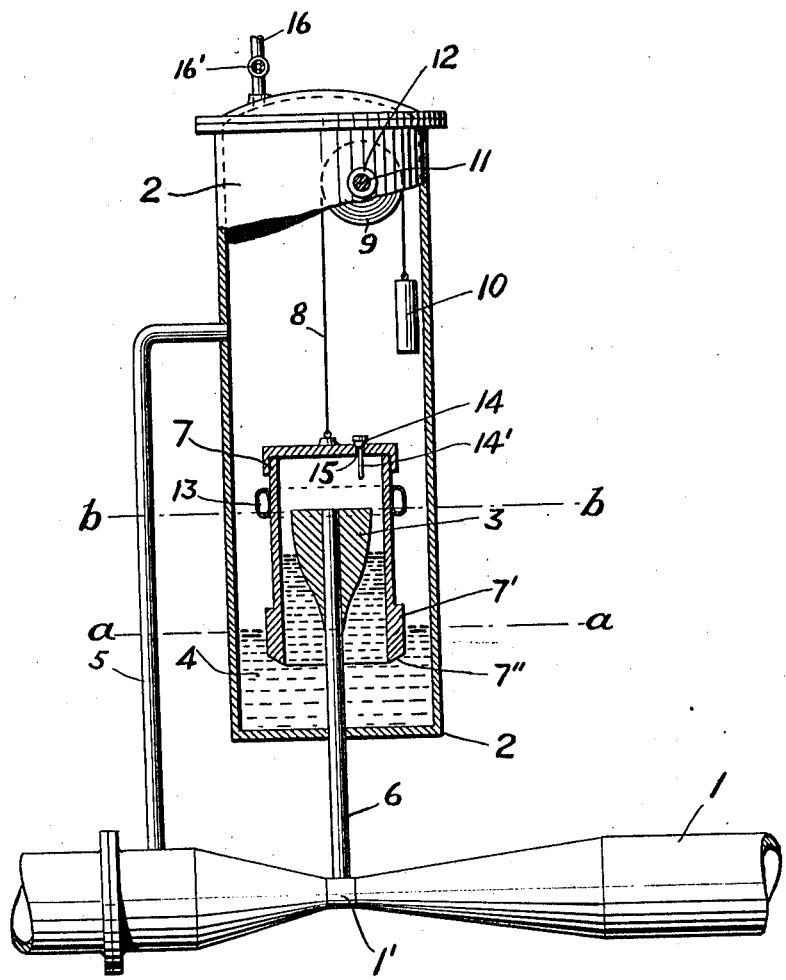
WITNESSES:
INVENTOR
John W. Ledoux
BY
ATTORNEY.

UNITED STATES PATENT OFFICE.

JOHN W. LEDOUX, OF SWARTHMORE, PENNSYLVANIA.

FLUID-METER.

1,026,324.

Specification of Letters Patent.　　Patented May 14, 1912.

Application filed June 22, 1911. Serial No. 634,723.

*To all whom it may concern:*

Be it known that I, JOHN W. LEDOUX, a citizen of the United States, residing at Swarthmore, in the county of Delaware and State of Pennsylvania, have invented certain Improvements in Fluid-Meters, of which the following is a specification.

My invention is an improved meter whereby differential pressures obtained from the flowing fluid to be measured effect a movement having a constant relation to changes in the velocity of the fluid.

My leading purposes are to obtain simplicity of construction and accuracy of action in a meter having an element or elements which will move at a rate bearing a constant relation to changes in the velocity of flow of the fluid to be measured.

The drawing represents a sectional elevation of a meter embodying my invention.

The mechanism shown in the drawing comprises the conduit 1 having the contracted section 1' (for carrying the fluid to be measured), in combination with the closed casing 2 containing the stationary displacing device 3 and a fluid 4 (of greater density than that to be measured), a duct 5 connecting the body or normal section of the conduit 1 with the interior of the casing 2 above the fluid 4 therein, and a duct 6 connecting the contracted section 1' of the conduit, through the device 3, with the interior of the casing above the fluid 4.

A hood 7 covers the device 3, is sealed by the fluid 4, and is suspended by a cord 8 passing over a sheave 9 to a counter weight 10, all suitably within the casing; the sheave being fixed on a shaft 11 journaled in bearings 12 and the shaft being adapted for operating a known type of integrating or indicating mechanism (not shown).

The hood 7 has its lower part 7' of enlarged but uniform cross-section, and the lowest portion 7'' of the form of an inverted cone, providing a float or displacing device in combination with a reservoir which is sealed without any substantial displacement of the heavier fluid (such as mercury) when there is no flow in the conduit. A buoy is provided by the pneumatic tube 13 fixed to the upper part of the hood where it is constantly immersed in the water or lighter fluid delivered to the casing from the conduit.

The displacing device 3, which is here shown supported by the pipe 6, is a figure of revolution such that its cross-sectional area increases from the line $a-a$, indicating the level of the mercury when there is no flow in the conduit 1, to the line $b-b$ to which the mercury within the hood rises when the flow in the conduit reaches the maximum. The cross-sections of the displacing device 3 and the displacing part of the hood 7 are such that the cross-section of the mercury rising within the reservoir or cylindrical interior of the hood, due to the displacement effected by the descent thereof with the rise of the velocity of flow in the conduit 1, shall control the movement of the hood so that such movement bears a constant ratio to the changes in the velocity of flow.

It will be understood that when there is no flow in the conduit 1 the fluid pressures communicated through the ducts 5 and 6 are the same, hence the pressures within and without the hood 7 are the same per unit area and the hood will stand at its greatest elevation with its lower edge touching the surface of the mercury whose level is that of the line $a-a$. But as the velocity of flow in the conduit rises the resultant or difference between the pressures communicated through the ducts increases, the lower or displacing part of the hood is forced downwardly in the mercury by the higher exterior pressure, the mercury displaced by the descending hood rises within the reservoir therein, and the height of the rising mercury column, which is a function of the resultant pressure, is determinative of the distance moved by the hood. Consequently, by suitably shaping the displacing devices (the member 3 and the bottom of the member 7 subject to immersion) the desired movement of the member 7 and the shaft 8 operated thereby are obtained.

A valve 14, provided with a stem 14', is carried by the closed top of the hood and automatically closes a port 15 therein. The stem is designed for engaging the part 3 to open the port if the hood should fall below its normal low level; the effect of opening the port being to equalize the pressures within and without the hood, prevent the loss of mercury by an overflow into the duct 6, and permit the egress of air.

A vent 16, controlled by a cock 16' is provided at the top of the casing for discharging air which may accumulate therein.

Having described my invention, I claim:

1. In a fluid meter, in combination with a conduit having a contracted section, a closed casing, a hood comprising a reservoir and a float, a fluid in said casing in which said float is adapted to be immersed and which seals said reservoir, ducts connecting said contracted section and a different section of said conduit with the interior of said casing above said fluid respectively within and without said reservoir, and a stationary displacing device of variable cross section within said reservoir, said displacing device and said float having complementary cross sections such that the movement of said hood bears a constant ratio to changes in the velocity of a fluid flowing in said conduit.

2. In a fluid meter, in combination with a conduit, a casing, a hood in said casing, means whereby said hood is counterbalanced and adapted to reciprocate, a liquid in said casing heavier than that to be measured and adapted for sealing said hood, a stationary displacing device of variable cross section within said hood, and means comprising ducts connecting said conduit with the interior of said chamber above said heavier liquid respectively within and without said hood whereby differential pressures exerted by fluid flowing in said conduit are caused to act upon said hood.

3. In a fluid meter, in combination with a conduit, a closed casing, a liquid heavier than that to be measured contained in said casing, a hood in said casing sealed by said liquid, means whereby said hood is balanced and adapted to reciprocate, a stationary displacing device of varying cross section disposed within said hood, and means comprising ducts whereby differential pressures are communicated from a fluid flowing in said conduit to the interior of said casing above said liquid respectively within and without said hood, the parts of said displacing device and said hood subject to immersion in said liquid having complementary cross sections which vary so that the movement of said hood bears a constant ratio to changes in the velocity of flow in said conduit.

4. In a fluid meter, in combination with a conduit, mechanism whereby the pressure of fluid flowing in said conduit is differentiated, a hood comprising a reservoir and a displacing device, a liquid which seals said reservoir and in which said displacing device is adapted to be immersed, means whereby said differentiated pressures are communicated to the interior and exterior of said hood, means whereby said hood is counter-balanced and adapted to be reciprocated by changes in said pressures, and a stationary displacing device of varying cross section disposed in said reservoir, the cross section of said stationary displacing device increasing from the normal level of said liquid to the higher levels attained thereby in said reservoir.

5. In a fluid meter, in combination with a conduit having a contracted section, a casing containing a liquid heavier than the fluid to be measured, a hood adapted to reciprocate in said casing and to be sealed by said liquid, a stationary device of variable horizontal cross section and adapted to displace said liquid in said hood, and ducts connecting said contracted section and a different section of said conduit with the interior of said casing above said liquid within and without said hood respectively.

6. In a fluid meter, in combination with a conduit, a casing, a reciprocating hood within said casing, said hood being provided with valve mechanism, means whereby differential pressures are communicated from fluid in said conduit to the interior of said casing above said liquid respectively within and without said hood, and means for displacing liquid within said hood and opening said valve mechanism when said hood has descended to a predetermined limit.

7. In a fluid meter, in combination with a conduit, a closed casing, a hood adapted to reciprocate within said casing, means for communicating differential pressures from fluid flowing in said conduit to the interior of said casing within and without said hood, a liquid in said casing for sealing said hood, a displacing device within said hood for regulating the rise of said liquid in said hood, and a valve vent for discharging air from said casing.

8. In a fluid meter, in combination with a conduit, a closed casing, a hood adapted to reciprocate within said casing, means for communicating differential pressures from fluid flowing in said conduit to the interior of said casing within and without said hood respectively, a liquid in said casing of greater specific gravity than that to be measured, and a float located above said heavier liquid and attached to said hood for exerting a constant force for lifting said hood.

In witness whereof I have hereunto set my name this 21st day of June, 1911, in the presence of the subscribing witnesses.

JOHN W. LEDOUX.

Witnesses:
 Jos. G. Denny, Jr.,
 C. N. Butler.